US008650617B2

(12) United States Patent  
Gleichauf (10) Patent No.: US 8,650,617 B2  
(45) Date of Patent: Feb. 11, 2014

(54) METHOD AND SYSTEM FOR REAL-TIME INSERTION OF SERVICES DURING A CALL SESSION OVER A COMMUNICATION NETWORK

(75) Inventor: Robert E. Gleichauf, San Antonio, TX (US)

(73) Assignee: Cisco Technology, Inc., San Jose, CA (US)

( * ) Notice: Subject to any disclaimer, the term of this patent is extended or adjusted under 35 U.S.C. 154(b) by 584 days.

(21) Appl. No.: 12/144,210

(22) Filed: Jun. 23, 2008

(65) Prior Publication Data

US 2008/0253545 A1  Oct. 16, 2008

Related U.S. Application Data

(63) Continuation of application No. 09/751,811, filed on Dec. 29, 2000, now Pat. No. 7,412,598.

(51) Int. Cl.
| | |
|---|---|
| *G06F 7/04* | (2006.01) |
| *H04L 29/06* | (2006.01) |
| *H04L 9/32* | (2006.01) |
| *G06F 21/00* | (2013.01) |
| *G06F 15/16* | (2006.01) |
| *H04N 7/16* | (2011.01) |

(52) U.S. Cl.
USPC ...... 726/4; 726/1; 726/26; 713/168; 713/170; 713/182; 709/217; 709/229; 725/25

(58) Field of Classification Search
USPC ............ 713/155, 168, 170, 182; 726/1, 4, 26; 709/217, 229; 725/25
See application file for complete search history.

(56) References Cited

U.S. PATENT DOCUMENTS

| | | | |
|---|---|---|---|
| 5,481,720 A | 1/1996 | Loucks et al. | 713/201 |
| 5,560,008 A | 9/1996 | Johnson et al. | 713/201 |
| 5,764,887 A | 6/1998 | Kells et al. | 713/200 |
| 5,768,379 A | 6/1998 | Girault et al. | 713/185 |
| 5,787,170 A | 7/1998 | Op de Beek | 713/165 |
| 5,815,574 A | 9/1998 | Fortinsky | 713/153 |
| 5,822,433 A | 10/1998 | Bottie et al. | 713/155 |
| 5,854,894 A | 12/1998 | Lancaster et al. | 709/219 |
| 5,864,665 A | 1/1999 | Tran | 713/201 |
| 5,920,562 A | 7/1999 | Christie et al. | 370/395 |
| 5,928,323 A | 7/1999 | Gosling et al. | 709/203 |
| 5,974,566 A | 10/1999 | Ault et al. | 714/15 |
| 5,983,273 A | 11/1999 | White et al. | 709/229 |
| 6,088,430 A | 7/2000 | McHale | 379/93.28 |
| 6,122,631 A | 9/2000 | Berbec et al. | 707/9 |
| 6,158,011 A * | 12/2000 | Chen et al. | 726/15 |

(Continued)

OTHER PUBLICATIONS

Woo et al., Authentication for Distributed Systems, 1992, IEEE pp. 39-51.

(Continued)

*Primary Examiner* — Aravind Moorthy  
(74) *Attorney, Agent, or Firm* — Baker Botts L.L.P.

(57) ABSTRACT

A method and apparatus for real-time insertion of services into an IP telephony call session are disclosed. A client initiates a service request message to a second server. The service request message includes the client identity and a requested service available from a second server. The first server determines if the client is authorized to use the requested service. If the client is authorized to use the requested service, the second server delivers the requested service to the client.

58 Claims, 3 Drawing Sheets

(56) References Cited

U.S. PATENT DOCUMENTS

| | | | |
|---|---|---|---|
| 6,212,548 B1 * | 4/2001 | DeSimone et al. | 709/204 |
| 6,219,710 B1 * | 4/2001 | Gray et al. | 709/227 |
| 6,393,481 B1 | 5/2002 | Deo et al. | 709/224 |
| 6,401,211 B1 | 6/2002 | Brezak et al. | 713/201 |
| 6,453,362 B1 | 9/2002 | Bittinger et al. | 719/316 |
| 6,477,708 B1 | 11/2002 | Sawa | 725/116 |
| 6,567,916 B1 | 5/2003 | Terao et al. | 713/176 |
| 6,594,249 B1 * | 7/2003 | Goldberg | 370/345 |
| 6,678,733 B1 | 1/2004 | Brown et al. | 709/229 |
| 6,760,759 B1 | 7/2004 | Chan | 709/219 |
| 6,839,757 B1 * | 1/2005 | Romano et al. | 709/226 |
| 6,937,699 B1 * | 8/2005 | Schuster et al. | 379/67.1 |
| 6,986,157 B1 | 1/2006 | Fijolek et al. | 725/111 |
| 2006/0106703 A1 | 5/2006 | Del Rey et al. | 705/35 |

OTHER PUBLICATIONS

Neuman et al, Kerberos: An Authentication Service for Computer Networks, 1994, IEEE, pp. 33-38.

Anonymous, Kerberos: A Mondel for Single Sing-On, 2004, Business Communications Review, p. 43.

Fontana, John, Web Services Security Spec Approved, 2004, Network Work, p. 22.

* cited by examiner

METHOD AND SYSTEM FOR REAL-TIME INSERTION OF SERVICES DURING A CALL SESSION OVER A COMMUNICATION NETWORK

CROSS-REFERENCE TO RELATED APPLICATION

This application is a continuation of U.S. application Ser. No. 09/751,811 filed Dec. 29, 2000 and entitled "Method and System for Real-Time Insertion of Services During a Call Session Over a Communication Network".

TECHNICAL FIELD OF THE INVENTION

This invention relates in general to Internet Protocol (IP) telephony, and more particularly to a method and system for real-time insertion of services during a call session over a communication network.

BACKGROUND OF THE INVENTION

IP telephony uses the Internet Protocol (IP) to transmit voice as packets over any data network that supports IP. Traditional circuit switched networks, such as the public switched telephone network (PSTN), establish a call by setting up an end-to-end circuit between two telephones. The switched connection is established for the duration of the telephone call, with a fixed bandwidth. In contrast, an IP telephony connection digitizes, compresses and converts the voice signal into IP packets and transmits the packets over the data network. Numerous different calls may share the same network and each participant in a call may have a different bandwidth that varies over the duration of the call depending on the amount of data being communicated over the network at any given time.

Conventional phone service provided over the PSTN requires a subscriber to pay for long distance service based on the number of minutes for the call. Furthermore, if the subscriber would like to add a special service, such as caller id, call forwarding or call waiting, the subscriber typically pays a monthly fee for the service. This fee is paid to the telephone company even if the subscriber does not use the service during the month. IP telephony service operates in a similar way because the subscriber is limited to services provided by an Internet Service Provider (ISP) for a fee during a specific period.

SUMMARY OF THE INVENTION

In accordance with the teachings of the present invention, disadvantages and problems associated with real-time insertion of services during a call session over a communication network have been substantially reduced or eliminated. In a particular embodiment, Session-based Services Telephony Protocol (SSTP) for use in Internet Protocol (IP) telephony is disclosed that allows a user to add services, such as the ability to send data for use in a word processing application or the ability to increase the level of encryption provided, during an IP telephony call session by requesting a desired service from a server coupled to a packet-based network.

In accordance with one embodiment of the present invention, a method for real-time insertion of services during a call session over a communication network includes initiating a Service Request Message (SRM) by a first client to a first server. The SRM includes the first client identity and a requested service available from a second server including a plurality of services. Upon receiving the message, the first server determines if the first client is authorized to receive the requested service. If the first client is authorized to receive the requested service, the second server delivers the requested service to the first client.

In accordance with another embodiment of the present invention, a communication system for real-time insertion of services during a call session over a communication network includes a client, a first device and a second device coupled to a communication network. The first device includes a list of clients authorized to receive a plurality of services. The second device inserts one or more of the services requested by the client into the call session if the list includes the client and the requested service.

Important technical advantages of certain embodiments of the present invention include the ability to add services for use during a call session. In a conventional communication system, a subscriber may use an extra service installed on a network if the subscriber requests and pays for the service before beginning the call session. The present invention allows the subscriber to add one or more services during a call session. If the equipment used by the subscriber is not capable of receiving the requested service, the necessary software may be configured at a remote location, such as a server, and uploaded onto a cache, or other suitable memory, associated with the subscriber's equipment. When the call session is terminated or the subscriber disconnects from or breaks communication with the call session, the service and associated software may be deleted from the subscriber's equipment by flushing the cache.

Another important technical advantage of certain embodiments of the present invention includes the ability of a service provider to charge a subscriber for a requested service based on use of the requested service. When the subscriber requests to use a service, either by subscribing to the service for specific time period, requesting the service prior to initiating a call session, or requesting the service during the call session, the service provider creates an account for the subscriber. The account may contain usage tokens for the requested service. Each time the subscriber uses the requested service, a usage token is deleted from the subscriber's account. The service provider, therefore, may track usage of the service and bill the subscriber based on the number of tokens used.

Other technical advantages will be readily apparent to one skilled in the art from the following figures, descriptions, and claims.

DETAILED DESCRIPTION OF THE INVENTION

Figure 1:
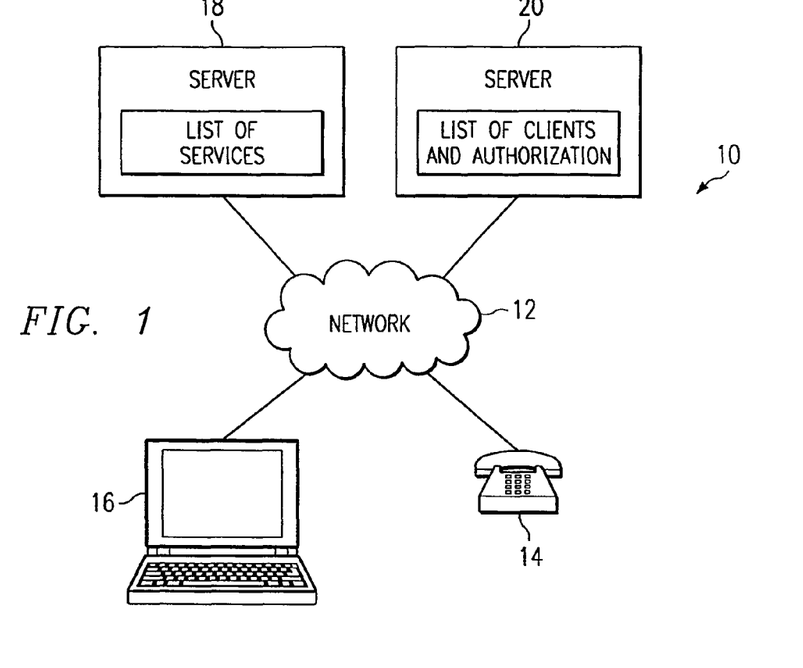
FIG. 1 illustrates a communication network incorporating one embodiment of the present invention.

FIG. 1 illustrates a block diagram of a communication system 10 that supports real-time insertion of services during a call session over network 12. System 10 includes network 12, clients 14 and 16, and servers 18 and 20. Server 18 includes a list of services that may be requested by clients 14 and 16 during a call session and associated software applications to execute the services. Server 20 includes a database containing a list of clients that may couple to network 12 and the services available from server 18 that each client is authorized to receive. Clients 14 and 16 may request authorization from server 20 to use one or more services stored on server 18. If server 20 determines that clients 14 and 16 are authorized to use a requested service, server 18 sends the requested service to clients 14 and 16. Although servers 18 and 20 are described as being separate, the list of authorized clients and the services and their associated applications may be physically located on a single device, such as a server, router, call manager, or other suitable network control device.

Network 12 may be a local area network (LAN), a wide area network (WAN), the Internet or other similar network that transmits packets of voice, video, data and other information (generally referred to as media). In a particular embodiment, network 12 may be an Internet Protocol (IP) network. However, network 12 may be any type of network that allows transmission of audio and video telecommunication signals, as well as traditional data communications. Although the invention will be described primarily with respect to IP communications, it should be understood that other appropriate methods of transmitting media over a data network, such as a Frame Relay, Asynchronous Transfer Mode (ATM), or other packet-based network, are also included within the scope of the present invention.

Network 12 may be coupled to other IP networks and may communicate media between clients 14 and 16, and other clients (not expressly shown) located on different, but interconnected, IP networks (not expressly shown). Network 12 may also be coupled to non-IP communication networks through the use of gateway devices. For example, network 12 may be coupled to a private branch exchange (PBX) or the public switched telephone network (PSTN) through an appropriate gateway (not expressly shown). The gateway may digitize the telephone or data signal from the PBX or PSTN if it is not already digitized, compress the digitized signal and route it to a destination over network 12 in packet form. The gateway may also convert packets of data into telephone signals that may be transmitted across the PBX or PSTN.

IP networks and other packet-based networks typically transmit media by placing data in cells, packets, frames, or other portions of information (generally referred to as packets) and sending each packet individually to the selected destination. Unlike a circuit-switched network, such as the PSTN, dedicated circuits and bandwidth is not required for the duration of a call session over network 12. Instead, clients 14 and 16 may send packets across network 12 as these resources become available for transmission. This feature makes resources available for additional communications when media is not being transmitted from clients 14 and 16.

The technology that allows voice media in particular to be transmitted over a packet-based network may be referred to as Voice over Packet (VoP). Clients 14 and 16 have the capability to encapsulate a user's voice or other content into IP packets so that the content may be transmitted over network 12. Clients 14 and 16 may be IP telephones, computers running telephony software, gateway devices, or any other device capable of performing telephony functions in an IP network. Clients 14 and 16 may also include a cache or any other type of storage medium for storing software applications and digital information.

System 10 includes servers 18 and 20 that communicate with clients 14 and 16 via network 12. Servers 18 and 20 may have access to storage mediums that include databases of information. Multiple services and the applications required to support the services may be available from server 18. Server 18 may inject one or more of the services requested by clients 14 and 16 into a call session over network 12. Such services may include, but are not limited to, text documents, telephone numbers, URLs, encoded music, graphics and videos communicated between clients 14 and 16, encryption or increased encryption for packets communicated over network 12, division of a conference call into multiple subgroups, and any other service suitable to be transmitted across network 12 in packet form and used by clients 14 and 16 during a call session. The applications available from server 18 may include, but are not limited to, light weight versions of a text editor, a spreadsheet tool, and a presentation tool similar to what can be found in MICROSOFT OFFICE application suite, ACROBAT READER, web browsers (e.g., NETSCAPE or MICROSOFT EXPLORER), a software application that plays music, a software application that allows a user to view a graphic or a photograph on a monitor, a software application that allows a user to view a movie, a software application that provides increased encryption for packets communicated over network 12, a software application that allows a user to break down a conference call into subgroups, or any other suitable application that may be configured at a remote location, such as server 18, transmitted in packet form over network 12 and executed by clients 14 and 16 during the call session.

Server 20 includes a list or directory containing clients that may communicate with network 12 and the services available from server 18 that each client is authorized to use. When clients 14 and 16 are connected to network 12, clients 14 and 16 may be assigned an IP address using dynamic host control protocol (DHCP) (not expressly shown) or another similar protocol or technique.

In one embodiment, clients 14 and 16 issue a registration request to server 20 by submitting their respective IP addresses and their identities in the form of a digital certificate, a username and/or password, or any other suitable way of providing identification information. Server 20 authenticates clients 14 and 16 by submitting the IP addresses to a DHCP server and the client identity information to an authentication system such as a Public Key Infrastructure (PKI) certificate authority, a Kerberos Domain Controller (KDC), or any other system suitable for authenticating the identity of a client or a user. If clients 14 and 16 are authenticated, the authentication system sends the authenticated credentials for clients 14 and 16 to server 20 and server 20 stores the credentials in the list.

Once the authenticated credentials for clients 14 and 16 are stored on server 20, the services available from server 18 may be added to the list. In one embodiment, client 14 may subscribe to the desired service from a service provider and may have pre-existing authorization to use one or more of the services available from server 18 for each call session initiated during a specific time period. In this example, the services may be added to the list on server 20 by the service provider and remain in the list until client 14 terminates the subscription for the service.

In another embodiment, client 14 may subscribe to a service provider for communication over network 12 but may not subscribe to any services available from server 18. After initiating a call session, client 14 may decide to add one of the services stored on server 18 to the call session. Server 20 authenticates client 14 and adds the requested service to the list of services that client 14 is authorized to use. The requested service may be removed from the list when server 20 receives a message indicating that the call session was terminated or client 14 disconnected from or otherwise broke communications with the call session.

In a further embodiment, client 14 may contact a service provider prior to initiating a call session to request a service available from server 18. In this example, the service provider may add the requested service into the list of clients stored on server 20 so that client 14 will be authorized to receive the requested service when the call session is initiated. If client 14 requests authorization to use the service for more than one call session, the service provider adds the requested service to the list stored on server 20 and specifies the number of times that client 14 may use the service. For example, if client 14 requests to use the service four different times, the service provider updates the authorization list on server 20 to reflect that client 14 is authorized to use the requested service four times. When server 20 receives a SRM from client 14 to use the requested service, server 20 authorizes client 14 to use the requested service during the call session and deletes an entry from the list authorizing client 14 to use the requested service. The updated list contains authorization for client 14 to use the requested service three additional times.

Although subsequent description refers to clients 14 and 16 as the participants in a call session, other clients coupled to network 12 or other networks coupled to network 12 may participant in the call session. During a call session, client 14 obtains a list of services available from server 18 and determines the IP address for client 16, which is participating in the call session. In one embodiment, client 14 may receive the list of services available from server 18 after being authenticated and authorized to use the services by server 20. Client 14 then initiates a Service Request Message (SRM) to server 20 to obtain authorization to use one or more requested services during the call session. In one embodiment, the SRM may include the requested service and the client identity for client 14 in the form of a digital certificate, username and/or password, or any other suitable means for providing identification information.

Server 20 authenticates client 14 by comparing the client identity with a list containing the authenticated credentials for each client that may communicate with network 12. If authentication fails, server 20 rejects the SRM from client 14. If the client identity matches one of the authenticated credentials in the list, server 20 determines if client 14 is authorized to use the requested service. If client 14 is not authorized to use the requested service, server 20 rejects the SRM from client 14. If client 14 is authorized to use the requested service, server 20 sends an authorization ticket to client 14. In one embodiment, the authorization ticket includes the client identity for client 14 and the requested service.

Client 14 sends the authorization ticket to server 18. In one embodiment, client 14 also sends the IP address associated with client 16 to server 18. Server 18 reads the authorization ticket and retrieves the requested service. Server 18 then sends the requested service to client 14 based on the client identity in the authorization ticket and to client 16 by using the IP address received from client 14. Although client 14 has been described as the requesting client, it should be understood that client 16, or any other client participating in the call session, may perform the described functions.

In one embodiment, clients 14 and 16 may not include the software application required to execute the requested service. Server 18 may configure the application associated with the requested service for use by clients 14 and 16 and load the required application into a cache or other suitable memory associated with clients 14 and 16. In another embodiment, client 14 may have access to the software application associated with the requested service, but client 16 may not have access to the application. If client 14 is authorized to use the requested service, server 18 may configure the software application associated with the requested service for client 16 and load the required application into the cache or other suitable memory associated with client 16.

In one embodiment, the software application and its associated service are transmitted over network 12 in packet form. Each packet travels through a protocol stack at the source and destination devices. The protocol stacks may be based on the Open System Interconnection Reference model (OSI model). The OSI model defines the communication characteristics for any given computer network and breaks communication between clients 14 and 16 coupled to network 12 into seven specific layers. The upper layers of the protocol stack are typically implemented in software and include the session layer, the presentation layer and the application layer. The session layer ensures that communication sessions, including service requests and service responses between applications, are properly established and maintained. The presentation layer manipulates the packets of information and ensures that information sent from the application layer for client 14 will be readable by the application layer of client 16. The application layer acts as a user interface for clients 14 and 16 to access network 12 services.

The services and applications available from server 18 may be inserted into the call session in one of the upper layers of the protocol stack. If the requested service is inserted into the call session, more media information is being transmitted between clients 14 and 16. Due to the increased media, client 14 may make a request for more bandwidth. In one embodiment, the request for more bandwidth may be made using the Resource Reservation Protocol (RSVP). RSVP is a network-control protocol that enables networks to obtain special qualities of service (QoS) for the media flow across the network. RSVP operates in conjunction with routing protocols in the transport layer of the protocol stack. If an RSVP server determines that the bandwidth for the call session may be increased, an acknowledgement message may be sent to client 14 indicating that the bandwidth has been increased. Otherwise, the RSVP server notifies client 14 that a best-effort mode may be used for communication on network 12. If the minimum required bandwidth is available, the call session provisioning proceeds by using the bandwidth to transfer the service over network 12 and between clients 14 and 16.

Figure 2A:
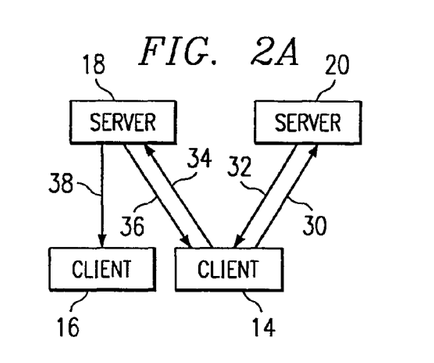
FIG. 2A illustrates a block diagram of one embodiment for inserting a requested service into a call session.
Figure 2B:
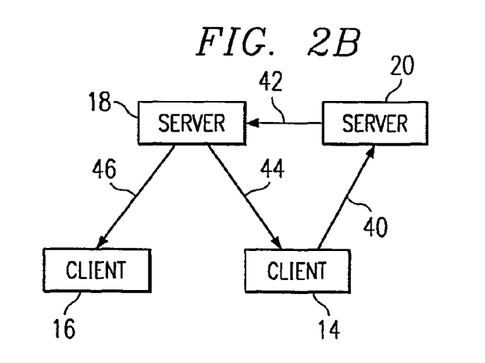
FIG. 2B illustrates a block diagram of an alternative embodiment for inserting the requested service into the call session.
Figure 2C:
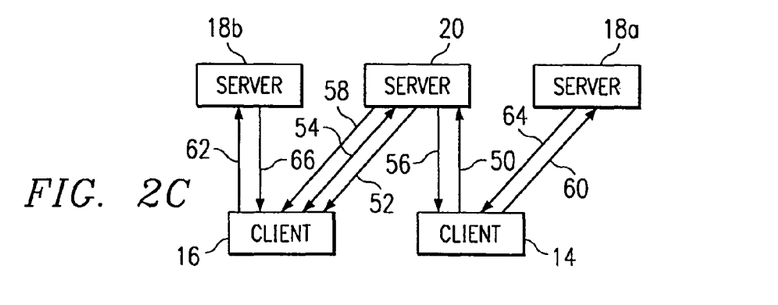
FIG. 2C illustrates a block diagram of a further embodiment for inserting the requested service into the call session.

Referring to FIGS. 2A through 2C, communication between servers 18 and 20 and clients 14 and 16 may occur over a single communication medium or multiple different communication mediums. The communication medium may be twisted pair wire, coaxial cable, fiber optic links, or any suitable communication medium for transmitting packets of information over network 12.

FIG. 2A illustrates a block diagram of one embodiment for real-time insertion of services into a call session. In the illustrated embodiment, client 14 initiates SRM 30 to server 20. SRM 30 includes the client identity associated with client 14 and one or more requested services available from server 18. Server 20 determines if client 14 is authorized to use the requested services by comparing the client identity and the requested services with a list and/or directory. The list includes authenticated credentials for each client that may communicate with network 12 and the services available from server 18 that each client is authorized to use. If server 20 determines that client 14 is authorized to use the requested services, server 20 sends authorization ticket 32 to client 14. Authorization ticket 32 includes the client identity and the requested services. In one embodiment, server 20 encrypts authorization ticket 32 using its private key.

Upon receiving authorization ticket 32, client 14 determines the IP address for client 16. Client 14 then sends authorization message 34 to server 18. Authorization message 34 includes the client identity and the requested services from authorization ticket 32, and the IP address for client 16. Server 18 decrypts authorization message 34 with a public key associated with server 20 and reads authorization message 34 to retrieve the requested services. Server 18 then sends service message 36 in a secure manner to client 14 by using the client identity from authorization message 32 and service message 38 to client 16 based on the IP address. Service messages 36 and 38 include the requested services from authorization message 34.

FIG. 2B illustrates a block diagram of an alternative embodiment for real-time insertion of services into a call session. In the illustrated embodiment, client 14 determines the IP address for client 16. In one embodiment, the IP address for client 16 may be obtained from a call manager (not expressly shown) coupled to network 12. Client 14 initiates SRM 40 to server 20 that includes the client identity associated with client 14, one or more requested services, and the IP address for client 16. Server 20 determines if client 14 is authorized to use the requested services by comparing the client identity and the requested services with a list of authorized clients.

If client 14 is authorized to use the requested services, server 20 sends authorization ticket 42 to server 18. By sending authorization ticket 42 to server 18, server 20 reduces the amount of communication occurring over network 12. Authorization ticket 42 includes the client identity associated with client 14, the requested services, and the IP address for client 16. In one embodiment, server 20 encrypts authorization ticket 42 using its private key. Server 18 decrypts authorization ticket 42 using a public key associated with server 20 and retrieves the requested services based on authorization ticket 42. Server 18 then sends service message 44 to client 14 based on the client identity in authorization ticket 42 and service message 46 to client 16 by using the IP address for client 16. Service messages 44 and 46 include the requested services from authorization ticket 42.

In an alternative embodiment, once server 20 determines that client 14 is authorized to use the requested service, server 20 uses the IP address to request a client identity for client 16. Client 16 receives the request and sends its identity to server 20. Server 20 compares the client identity for client 16 and the requested service with the list of authorized clients. If client 16 is authorized to use the requested service, server 20 sends authorization ticket 42 to server 18. The authorization ticket includes the client identities for clients 14 and 16, and the requested services. Server 18 reads authorization ticket 42 and sends the requested services to clients 14 and 16 based on the respective client identities.

FIG. 2C illustrates a block diagram of a further embodiment for real-time insertion of services into a call session. In the illustrated embodiment, client 14 determines the IP address for client 16. Client 14 initiates SRM 50 to server 20 that includes the client identity associated with client 14, one or more requested services, and the IP address for client 16. Server 20 determines if client 14 is authorized to use the requested services by comparing the client identity and the requested services with a list of authorized clients.

If client 14 is authorized to use the requested services, server 20 locates client 16 based on the IP address in the service request message and sends identity request message 52 to client 16. Client 16 sends client message 54, containing its identification information, to server 20. Server 20 compares the client identity for client 16 to the list of authorized clients. If client 16 is authorized to use the services requested by client 14, server 20 issues first authorization ticket 56 to client 14 and second authorization ticket 58 to client 16. First authorization ticket 56 includes the client identity associated with client 14 and the requested services, and second authorization ticket 58 includes the client identity associated with client 16 and the requested services. In one embodiment, first authorization ticket 56 and second authorization ticket 58 includes an application resource locator (ARL) that informs clients 14 and 16 where the requested services may be located. In one embodiment, server 20 encrypts first authorization ticket 56 and second authorization ticket 58 using its private key.

In an alternative embodiment, call session may include other participants and server 20 may obtain client identities for these participants. If client 14 is the only participant in the call session authorized to use the request services, server 20 denies SRM 50. If all clients are authorized to use the requested services, server 20 sends an authorization ticket to each client participating in the call session. If at least one of the clients is not authorized to use the requested services, server 20 sends a message to client 14 asking if client 14 wishes to proceed using the requested services with those clients that are authorized. If client 14 decides to use the requested services, server 20 sends an authorization ticket to the authorized clients, while the at least one unauthorized continues to participate in the call session without the added services.

In one embodiment, network 12 may be a WAN and clients 14 and 16 may be coupled to network 12 in different physical locations. In this example, server 18a may communicate with client 14 and server 18b may communicate with client 16. In one embodiment, client 14 may decrypt first authorization ticket 56 with a public key associated with server 20 and client 16 may decrypt second authorization ticket 58 using the public key for server 20. Client 14 re-encrypts first authorization ticket 56 with its private key and sends first authorization message 60 to server 18a. Using a similar method, client 16 re-encrypts second authorization ticket 58 with its private key and sends second authorization message 62 to server 18b via. Server 18a decrypts first authorization message 60 with a public key associated with client 14 and server 18b decrypts second authorization message 62 with a public key associated with client 16. Server 18a reads first authorization message 60 and server 18b reads second authorization message 62 to retrieve the requested services. Server 18a sends first service message 64 to client 14 and server 18b sends second service message 66 to client 16. Service messages 64 and 66 include the requested services from authorization messages 60 and 62, respectively.

In an alternative embodiment, once server 20 determines that client 14 is authorized to use the requesting service, server 20 sends first authorization ticket 56 to client 14 and second authorization ticket 58 to client 16. First authorization ticket 56 includes the client identity for client 14 and the requested services, and second authorization ticket 58 includes the requested services. Client 14 sends first authorization message 60 to server 18a, and client 16 sends second authorization message 62 to server 18b. First authorization message 60 includes the client identity for client 14 and the requested services, and second authorization ticket includes the requested services and the IP address associated with client 16. Server 18 retrieves the requested services based on first authorization message 60 and server 18b retrieves the requested services based on second authorization message 62. Server 18a delivers the requested service to client 14 via first service message 64 by using the client identity for client 14 and server 18b delivers the requested services to client 16 via service message 66 based on the IP address associated with client 16.

Figure 3:
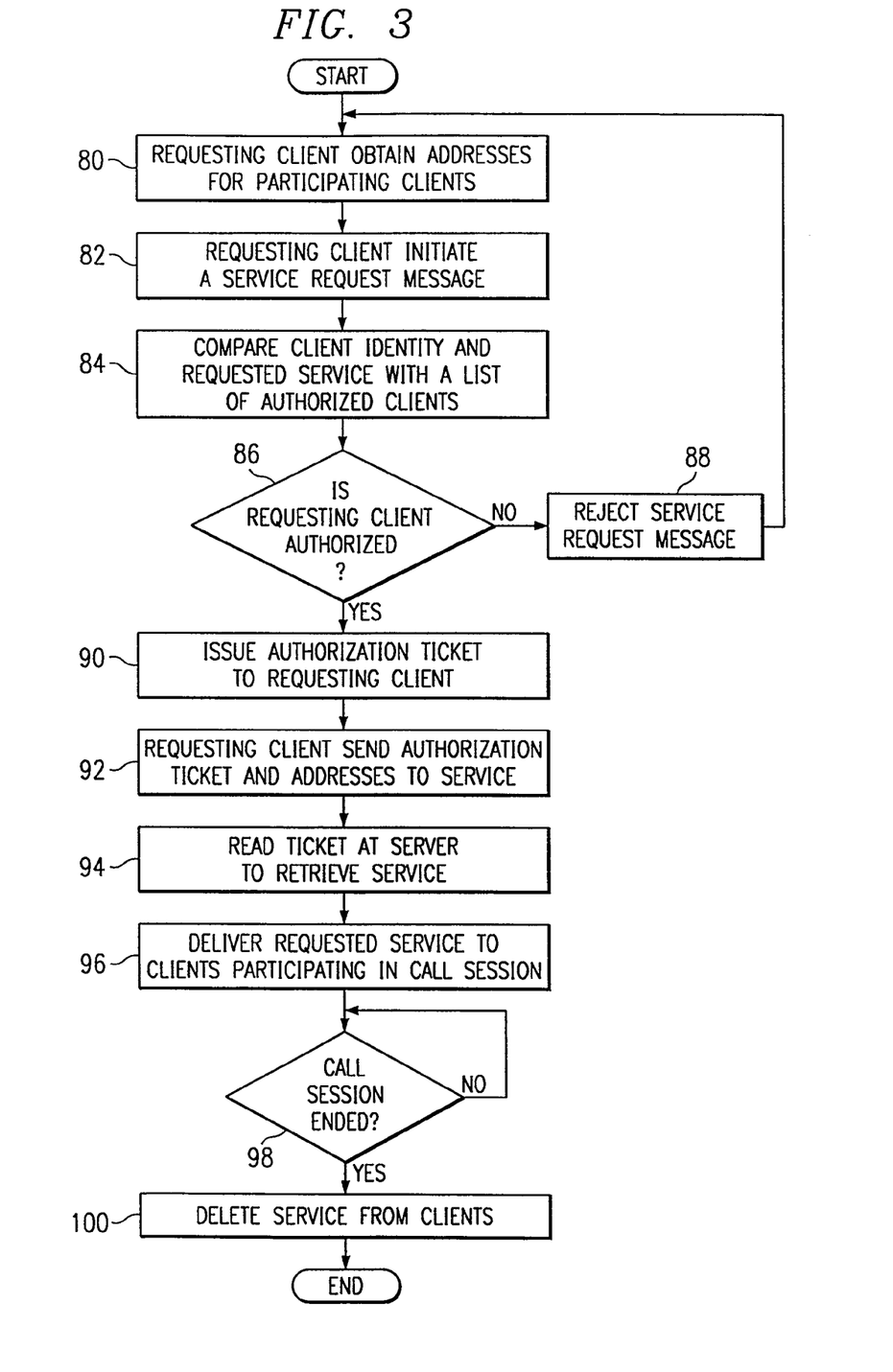
FIG. 3 illustrates a flowchart of a method for real-time insertion of services into a call session over the communication network.

FIG. 3 illustrates a flowchart of a method for real-time insertion of services during a call session over network 12. As shown, at step 80, client 14 obtains the IP address for client 16 and initiates a service request message to server 20 to obtain authorization to use a service available from server 18 during a call session at step 82. In one embodiment, the service request message includes the client identity for client 14 and the requested service. In an alternative embodiment, the service request message may also include the IP address associated with client 16. Server 20 receives the authorization request at step 84 and compares the client identity for client 14 and requested service with a list of clients and authorized services stored in a database associated with server 20.

Server 20 determines if client 14 is authorized to receive the requested service at step 86 based on the results of the comparison from step 84. If client 14 is not in the list, server 20 rejects the service request message at step 88 and sends a message denying client 14 authorization to use the requested service. If server 20 locates client 14 in the list but determines that client 14 is not authorized to use the requested service, server 20 denies the request and sends a message to client 14 rejecting the request at step 88. If server 20 locates client 14 in the list and determines that client 14 is authorized to use the requested service, server 20 sends an authorization ticket to client 14 at step 90. In one embodiment, the authorization ticket includes the client identity associated with client 14 and the requested service.

At step 92, client 14 sends the authorization ticket to server 18 to obtain the requested service. In one embodiment, client 14 may also send the IP address for client 16 to server 18 with the authorization ticket. Upon receiving the authorization ticket, server 18 reads the authorization ticket to retrieve the requested service in the database at step 94. Server 18 delivers the requested service to client 14 based on the client identity in the authorization ticket and to client 16 using the IP address associated with client 16. In one embodiment, the application to execute the requested service may not be installed on a cache or other suitable memory associated with each of clients 14 and 16. Server 18 may configure the requested service and upload the application to the caches associated with clients 14 and 16.

At step 98, server 20 determines if the call session has ended or clients 14 and 16 have disconnected from the call session. If the call session has ended, the requested service is removed from clients 14 and 16 by flushing the cache or other suitable memory associated with each of clients 14 and 16.

Figure 4:
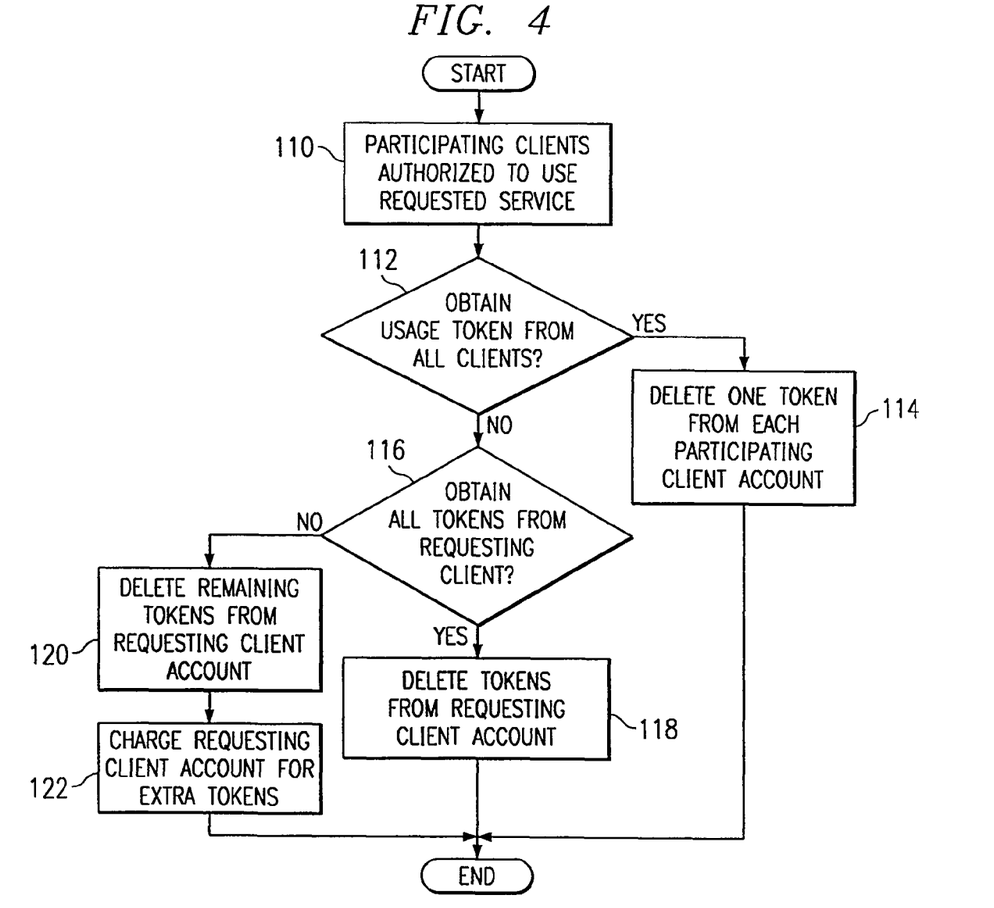
FIG. 4 illustrates a flowchart of a method for charging a client for use of the requested service.

FIG. 4 illustrates a flowchart of a method for charging clients 14 and 16 to use a requested service. At step 110, server 20 determines that clients 14 and 16 are authorized to use the requested service. When server 18 sends the requested service to clients 14 and 16, server 18 requests usage tokens from clients 14 and 16. In one embodiment, each usage token allows clients 14 and 16 to use the requested service during one call session. In an alternative embodiment, the usage token may allow clients 14 and 16 to use the requested service for a predetermined number of minutes. In another embodiment, tokens for clients 14 and 16 may be stored on server 20 and obtained by either clients 14 and 16 or server 18. If server 18 obtains a token from clients 14 and 16 at step 112, clients 14 and 16 delete one token from their respective accounts at step 114. If server 18 does not obtain a token from both clients 14 and 16 at step 112, server 18 requests a usage token from the requesting client, e.g., client 14, for both clients 14 and 16 at step 116. If client 14 provides server 18 with tokens for clients 14 and 16, client 14 deletes two tokens from its account. If client 14 does not provide server 18 with two tokens, client 14 deletes the remaining tokens in its account at step 120. Server 18 then charges the account associated with client 14 for the additional token at step 122.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of receiving a real-time insertion of services during a communication session over a communication network, comprising:

establishing, at a first client, a communication session between the first client and at least a second client, the communication session transporting media between the first client and the second client over a communication network, and the first client operable to present the media to a user;

initiating, at the first client, a service request message, the service request message including an identity of the first client and a requested service, the requested service supplemental to the media presented to the user;

receiving, at the first client, a real-time insertion of the requested service by a server into the communication session, the requested service received after a determination has been made that the first client is authorized to use the requested service based on an authorization list, wherein the authorization list comprises information concerning one or more clients authorized to use each of a plurality of services; and presenting, at the first client, the requested service to the user during the communication session.

2. The method of claim 1, wherein the media comprises voice media.

3. The method of claim 1, wherein the receipt of the requested service at the first client comprises:

receiving, at the first client, access to an application that presents content to the user, the content supplement to the media.

4. The method of claim 3, wherein the content is a document, a web page, music, graphics, or a video.

5. The method of claim 3, further comprising:

manipulating, at the first client, the content during the communication session.

6. The method of claim 3, wherein the first client in receiving access to the application receives at least a portion of the application, further comprising:

storing the at least a portion of the application in a cache at the first client, and executing, at the first client, the application during the communication session.

7. The method of claim 6, further comprising:

removing the at least a portion of the application in the cache at the first client after the communication session terminates.

8. The method of claim 1, wherein the receipt of the requested service at the first client comprises:

receiving, at the first client, content presented to the user, the content supplement to the media.

9. The method of claim 8, further comprising:
manipulating, at the first client, the content during the communication session.

10. The method of claim 8, wherein the content is a document, a web page, music, graphics, or a video.

11. The method of claim 1, further comprising:
receiving, at the first client, a list of available services, the list of available services being services for which the first client is authorized to use, and the service request message being a service selected from the list of available services.

12. The method of claim 11, wherein at least some of the list of available services are applications for which the first client is authorized to use.

13. The method of claim 11, further comprising:
displaying, on the first client as a menu to the user, at least some of the list of available services, the service selected from the list of available services being selected by the user.

14. The method of claim 1, wherein the media is transported in a network communication packet.

15. The method of claim 1, wherein the requested service is received in a network communication packet.

16. A method for real-time insertion of services during a communication session over a communication network, comprising:
maintaining a plurality of services, each of the plurality of services operable to be delivered to clients coupled to a communication network;
maintaining an authorization list, the authorization list comprising information concerning the clients authorized to use each of the plurality of services;
receiving a service request message from a first client having an established communication session with at least a second client, the communication session transporting media between the first client and the second client over a communication network, the first client operable to present the media to a user, the service request message including an identity of the first client and a requested service from a server, the requested service being one of the maintained plurality of services, and the requested service being supplemental to the media presented to the user;
determining whether the first client is authorized to use the requested service; and
if the first client is authorized to use the requested service:
providing to at least the first client a real-time insertion of the requested service into the communication session; and
presenting, at the first client, the requested service to the user during the communication session.

17. The method of claim 16, further comprising:
determining whether the second client is authorized to use the requested service; and
if the second client is authorized to use the requested services, providing to the second client a real-time insertion of the requested service into the communication session.

18. The method of claim 16, wherein the media comprises voice media.

19. The method of claim 16, wherein providing the first client real-time insertion of the requested service into the communication session comprises:
providing the first client access to an application that presents content to the user, the content supplement to the media.

20. The method of claim 19, wherein the content is a document, a web page, music, graphics, or a video.

21. The method of claim 19, wherein the access provided to the first client allows the user of the first client to manipulate the content during the communication session.

22. The method of claim 19, wherein providing access to the first cheat comprises:
providing at least a portion of the application to the first client, the application operable to be executed on the first client.

23. The method claim 16, wherein providing the first client real-time insertion of the requested service into the communication session comprises:
providing the first client content for presentation to the user, the content supplement to the media.

24. The method of claim 23, wherein the content can be manipulated by the user.

25. The method of claim 23, wherein the content is a document, a web page, music, graphics, or a video.

26. The method of claim 16, further comprising:
determining the services for which the first client is authorized to use to yield a list of available services for the first client; and
providing the list of available services to the first client, the service request message being a service selected from the list of available services.

27. The method of claim 26, wherein at least some of the list of available services are applications for which the first client is authorized to use.

28. The method of claim 16, wherein the media is transported in a network communication packet.

29. The method of claim 16, wherein the requested service is provided in a network communication packet.

30. An apparatus for receiving a real-time insertion of services during a communication session over a communication network, comprising:
a first client having logic encoded in media such that when executed is operable to:
establish a communication session between the first client and at least a second client, the communication session transporting media between the first client and the second client over a communication network, and the first client operable to present the media to a user;
initiate a service request message, the service request message including an identity of the first client and a requested service, the requested service supplemental to the media presented to the user;
receive a real-time insertion of the requested service by a server into the communication session, the requested service received after a determination has been made that the first client is authorized to use the requested service based on an authorization list, wherein the authorization list comprises information concerning one or more clients authorized to use each of a plurality of services; and
present, at the first client, the requested service to the user during the communication session.

31. The apparatus of claim 30, wherein the media, comprises voice media.

32. The apparatus of claim 30, wherein the logic in receiving the requested service at the first client receives access to an application that presents content to the user, the content supplement to the media.

33. The apparatus of claim 32, wherein the content is a document, a web page, music, graphics, or a video.

34. The apparatus of claim 32, wherein the logic is further operable to:
manipulate the content during the communication session.

35. The apparatus of claim 32, wherein the logic in the first client in receiving access to the application receives at least a portion of the application, and is further operable to:
store the at least a portion of the application in a cache at the first client, and
execute, at the first client, the application during the communication session.

36. The apparatus of claim 35, wherein the logic is further operable to:
remove the at least a portion of the application in the cache at the first client after the communication session terminates.

37. The apparatus of claim 30, wherein the logic in receiving the requested service at the first client receives content for presentation to the user, the content supplement to the media.

38. The apparatus of claim 37, wherein the logic is further operable to:
allow the user to manipulate the content during the communication session.

39. The apparatus of claim 37, wherein the content is a document, a web page, music, graphics, or a video.

40. The apparatus of claim 39, wherein at least some of the list of available services are applications for which the first client is authorized to use.

41. The apparatus of claim 39, wherein the logic is further operable to:
display, on the first client as a menu to the user, at least some of the list of available services, the service selected from the list of available services being selected by the user.

42. The apparatus of claim 30, wherein the logic is further operable to:
receive a list of available services, the list of available services being services for which the first client is authorized to use, and the service request message being a service selected from the list of available services.

43. The apparatus of claim 30, wherein the media is transported in a network communication packet.

44. The apparatus of claim 30, wherein the requested service is received in a network communication packet.

45. A system for real-time insertion of services during a communication session over a communication network, comprising:
logic encoded in media such that when executed is operable to:
maintain a plurality of services, each of the plurality of services operable to be delivered to clients coupled to a communication network;
maintain an authorization list, the authorization list comprising information concerning the clients authorized to use each of the plurality of services;
receive a service request message from a first client having an established communication session with at least a second client, the communication session transporting media between the first client and the second client over a communication network, the first client operable to present the media to a user, the service request message including an identity of the first client and a requested service from a server, the requested service being one of the maintained plurality of services, and the requested service being supplemental to the media presented to the user;
determine whether the first client is authorized to use the requested service; and
if the first client is authorized to use the requested service:
provide to at least the first client a real-time insertion of the requested service into the communication session; and
present, at the first client, the requested service to the user during the communication session.

46. The system of claim 45, wherein the logic is further operable to:
determine whether the second client is authorized to use the requested service; and
if the second client is authorized to use the requested services, provide to the second client a real-time insertion of the requested service into the communication session.

47. The system of claim 45, wherein the media comprises voice media.

48. The system of claim 45, wherein the logic in providing the first client the real-time insertion of the requested service into the communication session provides the first client access to an application that presents content to the user, the content supplement to the media.

49. The system of claim 48, wherein the content is a document, a web page, music, graphics, or a video.

50. The system of claim 48, wherein the logic in providing access to the first client allows the user of the first client to manipulate the content during the communication session.

51. The system of claim 48, wherein the logic in providing access to the first client provides at least a portion of the application to the first client, the application operable to be executed on the first client.

52. The system method claim 45, wherein the logic in providing the first client the real-time insertion of the requested service into the communication session provides the first client content for presentation to the user, the content supplement to the media.

53. The system of claim 52, wherein the content can be manipulated by the user.

54. The system of claim 52, wherein the content is a document, a web page, music, graphics, or a video.

55. The system of claim 45, wherein the logic is further operable to:
determine the services for which the first client is authorized to use to yield a list of available services for the first client; and
provide the list of available services to the first client, the service request message being a service selected from the list of available services.

56. The system of claim 45, wherein at least some of the list of available services are applications for which the first client is authorized to use.

57. The system of claim 45, wherein the media is transported in a network communication packet.

58. The system of claim 45, wherein the requested service is provided in a network communication packet.

* * * * *